United States Patent [19]

Bergman

[11] Patent Number: 5,052,660
[45] Date of Patent: Oct. 1, 1991

[54] ELECTRICAL WIRE THREADING APPARATUS

[76] Inventor: William Bergman, R.D. #1, Box 250, Deposit, N.Y. 13754

[21] Appl. No.: 583,404

[22] Filed: Sep. 17, 1990

[51] Int. Cl.[5] ............................................. B66D 1/36
[52] U.S. Cl. ......................................... 254/134.3 FT
[58] Field of Search ................... 15/104.33, 104.32; 403/296, 343; 254/134.3 FT, 134.3 R

[56] References Cited

U.S. PATENT DOCUMENTS

| | | |
|---|---|---|
| 1,730,993 | 10/1929 | Buchanan et al. |
| 2,559,160 | 7/1951 | Jacob . |
| 2,750,152 | 6/1956 | Schinske ..................... 254/134.3 FT |
| 2,980,398 | 4/1961 | Raney et al. ............. 254/134.3 FT |
| 3,102,715 | 9/1963 | Weitzel et al. ............ 254/134.3 FT |
| 3,368,271 | 2/1968 | Scheffler .............................. 403/296 |
| 3,854,848 | 1/1975 | MacFetrich . |
| 4,077,609 | 3/1978 | MacFarlane .............. 254/134.3 FT |

Primary Examiner—Robert C. Watson
Attorney, Agent, or Firm—Salzman & Levy

[57] ABSTRACT

The present invention features a fish constructed of assembled sections of fiberglass rods, one-quarter inch in diameter. Each length of fish section is provided with a female connection on opposite distal ends. A connector having a male end at both sides is also provided so that any length of fish can be assembled to suit the job requirement. It has been found that assembled six foot sections of fiberglass having a one-quarter inch diameter will provide the best flexibility over a wide range of lengths. Each six foot section is of a length that is easily stored, transported and handled by a skilled electrician. Each male and female connection is preferably made of steel or other metal to provide strength at the joints of the fiberglass sections.

6 Claims, 1 Drawing Sheet

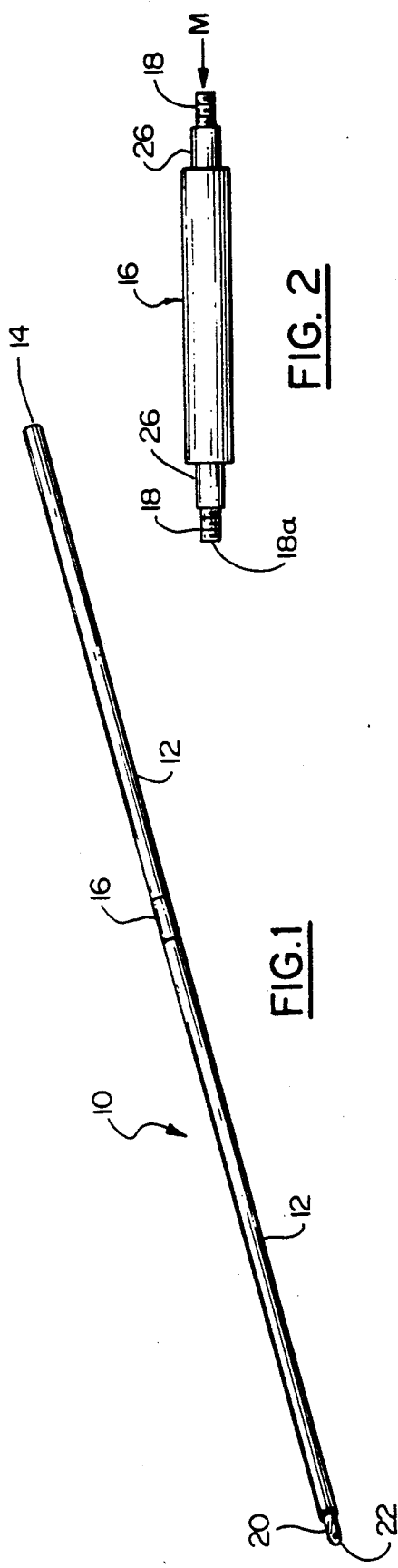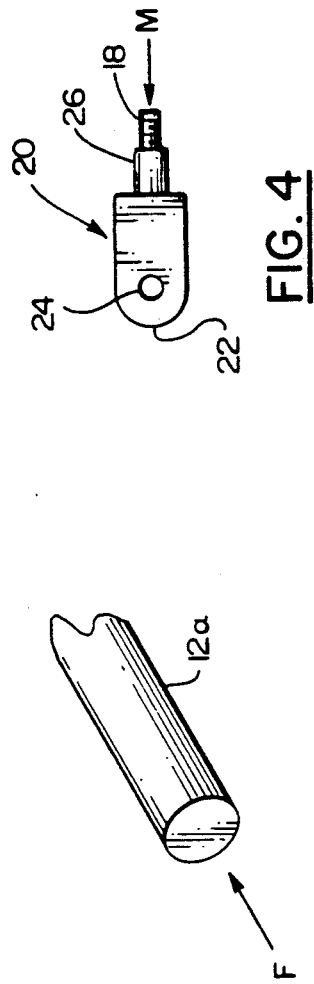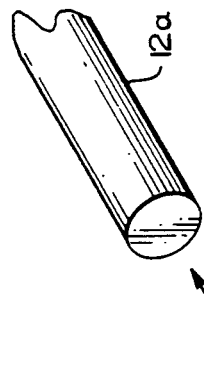

ELECTRICAL WIRE THREADING APPARATUS

FIELD OF THE INVENTION

The invention pertains to a fish for snaking electrical wires through existing stud walls, and more particularly to a universal-type, fiberglass fish that has uniquely flexible sections that attach to each other to form a longer fish member as needed.

BACKGROUND OF THE INVENTION

The present invention relates to a fish device commonly used by electricians for snaking wires through existing stud walls. Wires such as electrical house wiring, telephone lines, thermostat wire, TV cables and alarm system cables are all located and positioned, by pulling, during house construction and especially during remodelling.

One of the problems with conventional fish tapes is that they are intended to be used in conduits and are therefore too flexible to be used in stud frame housing. Commercially available fish tapes, as currently fabricated for the trade, are of fixed length of either 50' or 200' and can only pull wire from one direction.

Fish members are not currently chosen to have the proper flexibility over a longer length. Commercially available fish members will more than likely be too flexible, resulting in coiling when an obstruction is encountered. Plaster, fiberglass insulation, and even sawdust are examples of obstructions likely to be encountered in existing structures. No one fish ever seems right for all of the tasks of a total job. The result is that fish members are often too flexible to use with existing stud walls and are not suitable to accommodate different snaking operations.

Another problem with fish devices is that they tend to twist due to their flexibility. Usually, the electrician finds that it is difficult to direct the fish in a particular direction, because it tends to move, twist or become snagged on the walls.

Also, many fish are constructed from metals, such as steel, iron or aluminum, in order to provide strength for narrow cross-sectional configurations. In electrical work, such conductive materials pose an unwanted electrical hazard.

One of the objects of the present invention is to construct a fish from sections that can be assembled to different lengths, and wherein the constructed length of fish will have the desired flexibility over a wide range of lengths.

Another object of the invention is to provide a fish that can be universally applicable for a wide variety of jobs.

Yet another object of the invention is to provide a fish that can be either pulled, as are conventional fish, or pushed in any direction through existing stud walls.

Another object of the present invention is to provide a semi-rigid member that is resistant to coiling upon encountering obstructions in existing stud walls.

Still another object of this invention is to provide a fish that can be assembled to accommodate different job length requirements, but whose sections are of a convenient length for storage, transportation and handling.

A further object of the present invention is to provide a fish having sufficient strength, non-conductivity and flexibility for a wide variety of jobs.

DISCUSSION OF RELATED ART

In U.S. Pat. No. 1,730,993 issued to Buchanan, a steel fish line is illustrated having a head member on the end of the wire. The head member has a hole therein for accommodating a wire.

In U.S. Pat. No. 2,559,160, issued to J. G. Jacob, an apparatus is shown for pushing fish wire through conduits. Cams are used to force the fish through the conduits. The cams are attached to hand grippable levers that rotatably force the levers into engagement with the fish disposed within the conduit, thus forcing the fish forward within the tube.

An insulating tape for wrapping a conductive fish line is depicted in U.S. Pat. No. 2,750,152, issued to W. G. Schinske.

In U.S. Pat. No. 3,858,848, issued to MacFetrich, a multi-layered fish is illustrated having a core material that is different than the outer layer material. The core is designed to provide strength in tension, while the outer layer material provides abrasion-resistance.

All of the foregoing references describe a fish used in conduits, but none discloses existing, "old work" electrical wire applications in a stud wall environment.

SUMMARY OF THE INVENTION

In accordance with the present invention, there is provided a fish constructed of assembled sections of even lengths of fiberglass rods, one-quarter inch in diameter. Each length of fish section is provided with a female connection on opposite distal ends. A connector having a male end at both sides is also provided so that any length of fish can be assembled to suit the job requirement. It has been found that assembled six foot sections of fiberglass having a one-quarter inch diameter will provide the best flexibility over a wide range of lengths. Each six foot section is of a length that is easily stored, transported and handled by a skilled electrician. Each male and female connection is preferably made of steel or other metal to provide strength at the joints of the fiberglass sections.

In an alternate embodiment, the fiberglass rods are fabricated with an oval cross-section, so that they are more flexible in one plane with respect to an orthogonal plane. Such a fish will be easier to control in walls and attic spaces, and will have less of a tendency to twist and become snagged in existing stud walls.

BRIEF DESCRIPTION OF THE DRAWINGS

A complete understanding of the present invention may be obtained by reference to the accompanying drawings, when taken in conjunction with the detailed description thereof and in which:

FIG. 1 is a perspective view of an assembled fish member constructed of the male and female sections of this invention;

FIG. 2 is a plan view of a connector having two male ends;

FIG. 3 is a perspective view of a female end of a fish section of FIG. 1;

FIG. 4 is a plan view of a special end piece for the fish member of FIG. 1; and

FIG. 5 is a partial perspective view of an alternate embodiment of the fish member of FIG. 1, depicting an oval cross-section therefor.

The invention will be better understood with reference to the following detailed description considered in

DETAILED DESCRIPTION OF THE INVENTION

Generally speaking, the invention features a fish member for snaking wire through existing stud walls. The body of the fish is constructed from substantially equal length sections of fiberglass rods of one-quarter inch in diameter. The rods are assembled together in tandem by means of male metal connector segments that are adapted to assemble with the female connections disposed upon distal ends of each fish section. The fish assembly has the proper semi-flexibility over a wide variety of lengths.

For the sake of clarity, all elements of similar construction will have the same number designation throughout the figures.

Now referring to the figures, FIG. 1 is a perspective view of the assembled fish 10 of this invention. The fish 10 is assembled from substantially equal six-foot lengths of fiberglass rods 12 having a diameter of one-quarter inch. Both ends 14 (FIG. 3) of the six-foot lengths of rods 10 terminate in female connectors, having screw threads disposed therein. The assembly 10 is constructed from individual rod sections 12, as illustrated.

A connector element 16, having male screw threads 18 (FIG. 2) on both sides, described in greater detail hereinbelow, is used to attach the longer rods 12 to one another.

A front, or end section 20, has a rounded beveled end 22 (FIG. 4), that contains a hole 24 through which a 12 awg stripped bare wire, not shown, is threaded during use. Front section 20 is also metal and is similarly equipped with male screw threads 18 for engagement with the female counterpart connector 14 of body portion 12. Front end section 20 is a metal piece, considerably shorter (on the order of inches) than section rods 12, for the user's convenience in handling the fish sections during assembly. As long as the front section 20 can mate with a body section 12, as hereinbelow described, the length of front section 20 need not equal that of the other sections.

This invention exploits the discovery that extended lengths of fiberglass rods of about one-quarter inch thickness have the most favorable semi-rigidity.

Fish member 10 is constructed by the user by assembling sections 12 in tandem, alternating with connectors 16, making it easy to store, transport and handle the sections.

Body sections 12 are all of the same construction, and feature two metal female "F" portions 14 on opposite distal ends, as depicted in FIG. 3. The female "F" portions 14 are metal, threaded tubes approximately 2" long and slightly greater than ¼" in diameter in the preferred embodiment and are affixed to rods 12 by glue; inserts may also be used without departing from the scope of the present invention. Moreover, the metal portions 14 can be crimped onto the end portions of the fiberglass rod sections 12.

The male ends "M" of metal connectors 16 comprise a metal threaded portion 18 having a round tip 18a for insertion into the metal, hollow end 14 of the threaded portion of the female section "F" of rods 12. The metal portions 14, 18 provide strength at the junctions between the rod sections 12. A metal shaft 26 between threaded portion 18 and connector body 16 or 20 performs an additional strengthening function to prevent rupture of the connecting link of the fish when it is flexed.

It should be noted that all male "M" and female "F" connecting threads are interchangeable, in that a front portion 20 may be mated to either end of a body portion 12, as may either male "M" end of any connector 16.

In an alternate embodiment, the rod cross-sections can be made oval, as shown by the rod 12a of FIG. 5. Configuring the rod 12a in an oval cross-section will provide more flexibility in one plane with respect to its orthogonal plane. A fish having greater flexibility in one plane over that of the other perpendicular plane provides a means to direct the fish 10 about obstacles with greater facility. Oval shaped rods can be assembled by snap-on connections (not shown), which are permissible over shorter lengths.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A fish device for snaking wire through an existing stud wall, comprising:
   (a) a first fiberglass rod of approximately one-quarter inch in diameter, said fiberglass rod having two hollow female connections on opposite distal ends thereof, each female connection being fabricated of metal to provide strength, and each metal female connection being crimped at one end thereof, proximate said fiberglass rod, to ensure attachment thereto, the other end of each of said female section having threaded portions;
   (b) a front metal section having a rounded, beveled end containing a hole for supporting a stripped electrical wire, said front section having a male screw thread connection adapted to fit into said hollow threaded portion of one of said female connections;
   (c) a second fiberglass rod of approximately one-quarter inch in diameter, said second fiberglass rod having two hollow female connections on opposite distal ends thereof, each female connection being fabricated of metal to provide strength, and each meal female connection being crimped at one end thereof, proximate said second fiberglass rod, to ensure attachment thereto, the other end of each of said female sections having threaded portions; and
   (d) a metal connector having two male screw thread connections on opposite ends thereof, adapted to fit into said hollow threaded portion of each of said respective first and second fiberglass rod female connections.

2. The fish device of claim 1 wherein the hole of said rounded beveled end of said front section supports an electrical wire of approximately 12 awg.

3. The fish device of claim 2, wherein said fiberglass rods have an oval cross-section.

4. A fish device for snaking wire through a stud wall, comprising:
   sections of fiberglass rods of approximately one-quarter inch in diameter, each of said fiberglass rods having hollow threaded female connections on opposite distal ends thereof, each connection being fabricated of metal to provide strength between junctions of each fiberglass rod, and each metal female connection being crimped at one end thereof, proximate the respective end of each of said fiberglass rods, to ensure attachment thereto, and a front metal section being substantially shorter than the other of sad sections of fiberglass rods and having a rounded, beveled end containing a hole for supporting a stripped electrical wire.

5. The fish device of claim 4, wherein the hole of said rounded beveled end supports an electrical wire of approximately 12 awg.

6. The fish device of claim 5 wherein said sections of fiberglass rods are approximately six feet long and said front metal section is less than two inches long.

* * * * *